United States Patent [19]

Friedericy et al.

[11] 4,186,623

[45] Feb. 5, 1980

[54] MULTI-RIM FLYWHEEL ATTACHMENT

[75] Inventors: Johan A. Friedericy, Palos Verdes Estates; Dale O. Moeller, Rolling Hills; Dennis A. Towgood, Huntington Beach, all of Calif.

[73] Assignee: The Garrett Corporation, Los Angeles, Calif.

[21] Appl. No.: 892,587

[22] Filed: Apr. 3, 1978

[51] Int. Cl.² ............ F16F 15/30; F16C 15/00; H02K 7/02
[52] U.S. Cl. .................... 74/572; 29/159 R; 74/230.4; 156/74; 156/75
[58] Field of Search ......... 74/572, 230.4, 230.5; 29/159 R, 159.1; 310/67; 156/74, 75

[56] References Cited

U.S. PATENT DOCUMENTS

| | | | |
|---|---|---|---|
| 284,369 | 9/1883 | Blank | 74/572 |
| 1,765,754 | 6/1930 | Burger | 74/572 |
| 2,539,730 | 1/1951 | DeFosse | 74/572 |
| 3,296,886 | 1/1967 | Reinhart | 74/572 |
| 3,602,066 | 8/1971 | Wetherbee | 74/572 |
| 3,602,067 | 8/1971 | Wetherbee | 74/572 |
| 3,683,216 | 8/1972 | Post | 74/572 |
| 3,741,034 | 6/1973 | Post | 74/572 |
| 4,036,080 | 7/1977 | Friedericy et al. | 74/572 |

FOREIGN PATENT DOCUMENTS 7262 of 1890 United Kingdom ............ 74/572

*Primary Examiner*—Samuel Scott
*Assistant Examiner*—Daniel J. O'Connor
*Attorney, Agent, or Firm*—Joel D. Talcott; Albert J. Miller

[57] ABSTRACT

Spacers are positioned between adjacent rims of a multi-rim composite flywheel in alignment with hub spokes thereof to improve flywheel performance while minimizing radial stress.

14 Claims, 4 Drawing Figures

MULTI-RIM FLYWHEEL ATTACHMENT

The Government has rights in this invention pursuant to Contract No. DAAG53-75-C-0270 awarded by the Department of the Army.

This invention relates to energy storage devices and, more particularly, to a multi-rim composite flywheel which is formed of a hub having a plurality of spokes and a plurality of nested rims which are mounted on the hub in a non-circular configuration and attain a substantially circular configuration when the flywheel is rotating at its operational speed.

Modern advances in urban transportation systems have been geared toward the transportation of a maximum number of people with the utilization and waste of a minimum amount of energy. Additionally, it has been desired to minimize the amount of pollution produced by the vehicles. Accordingly, new vehicle power systems have been investigated at great length. One such device is the flywheel.

A flywheel may be utilized as a primary power source for a small vehicle or as an auxiliary power supply providing added energy when it is necessary for acceleration. Energy is stored in the flywheel by causing it to rotate at high speed (often in excess of 2,000 feet per second) around a hub. By mounting the flywheel on low friction bearings and in an evacuated chamber, energy losses can be greatly minimized. Rotation of the flywheel powers a generator which supplies electric power to run a motor for powering the vehicle.

During braking, the motor and generator switch functions so that energy which would normally be lost in the form of heat during braking is returned to the flywheel and stored for later utilization. Alternatively, a direct mechanical drive coupling may be made between the flywheel and the drive wheels through a suitable transmission. Thus, the flywheel provides a highly efficient and simple means for storing energy for vehicles or other devices.

However, construction of such a flywheel presents substantial difficulties. For example, some prior art flywheels have been constructed with a circular metallic rim or hoop connected by thin spokes to a hub. The amount of energy stored in such a flywheel is proportional to the mass inertia of the rim and to the square of the rotational speed. Accordingly, it would appear that by taking a massive flywheel and spinning the wheel at increasing speeds, as much energy as desired could be stored in the flywheel. However, as the mass and speed increase, the hoop stress resulting from centrifugal force also increases, ultimately surpassing the tensile strength of the material and causing the flywheel to come apart. This problem is even more prevalent in solid flywheels. Accordingly, a material for use in a flywheel must have very high strength in both the tangential and radial directions.

While it might initially appear that heavier materials would be more suited for use in flywheel construction, it has been found that a decrease in mass permits the flywheel to be operated at a much higher speed for the same material strength. Inasmuch as the energy stored is proportional to the first power of the mass and to the second power of the angular speed, the use of lighter materials of comparable strength actually permits flywheels to store greater amounts of energy. Accordingly, a high strength-to-density ratio is a principal requirement in the selection of a flywheel material.

Great success has been attained by constructing the rim of a filament material wound uni-directionally in a matrix. Examples of this construction are fiberglass or a proprietary product of E. I. du Pont de Nemours and Company designated "Kevlar" filament material wound in a suitably epoxy resin. Experiments with flywheel construction of such material have shown that the hoop strength provided by the wound filaments comfortably exceeded the tangential stresses applied to the flywheel. However, the radial stresses tended to be greater than the strength of the matrix, causing the flywheel to delaminate, i.e. the flywheel would break up in substantially concentric rings.

It was thus determined that a more suitably flywheel construction would be one comprising a plurality of nested concentric circular cylinders, each made of a wound filament material in a matrix. The thickness of each rim portion of such a flywheel is limited so that the radial stress across the portion is very small in magnitude, i.e. the variation from the surface to the outer surface is not sufficient to produce delamination of the cylinder.

While this construction has been recognized as ideally superior, attempts to operate such a flywheel using prior art construction techniques were unsuccessful until the invention of the flywheel disclosed in U.S. Pat. No. 4,036,080, issued to Johan A. Friedericy and Dennis A. Towgood on Nov. 29, 1974, which permits the utilization of a multi-section rim assembly, maintains the structural integrity of the flywheel from rest to maximum operational velocity, and ensures that the flywheel will be in a properly dynamically balanced configuration at its operational velocity.

This flywheel design comprises a multi-segment rim assembly mounted on a hub having a predetermined number of spokes. The radius of the inner surface of the rim assembly is smaller at rest than is the radius of the spokes on which it is to be mounted so that the rim assembly is mounted on the spokes in a non-circular configuration. When the flywheel is operating at design speed, centrifugal force acting on the components of the flywheel causes the rim assembly to attain a substantially circular configuration in proper dynamic balance with each segment of the rim assembly sectionally engaging at least portions of the adjacent segments and the inner segments of the rim assembly engaged by the spokes.

However, it has been found that a significant level of radial compressive stress may be applied inwardly against the spokes of the hub by the rims of such a flywheel during rotation, resulting in possible filament and matrix damage. The reason for this is related to the fact that, while the rim assembly attains a substantially circular configuration at the flywheel's operating speed, at intermediate speeds, the rims are less than circular in shape. While becoming circular, each rim is subject to substantial circumferential stress. This is, readily taken up by the circumferentially wound filaments. However, because the rims are less than circular in shape, this tension is applied as an inward radial force at the mounting points which are radially aligned with the spokes. Furthermore, the radial force applied by each of the rims combines with that applied by all other rims so that a potentially damaging level of stress is applied at the point of contact between each spoke and the filaments of the inner rim. If all of the rims could attain as much circularity as possible during flywheel acceleration, a much reduced level of compressive stress would be concentrated at the point of contact with the hub.

One means of accomplishing this condition is by constructing the flywheel with inner and outer sets of rims made of filament material having different elastic moduli such that the outer, stiffer rim segments are loaded between the spokes by inner, more flexible segments. This stratification of properties in the ring segments assures tight contact between adjacent rim segments for more uniform circularity of the rims at intermediate speeds and is illustrated in our U.S. patent application Ser. No. 816,057, filed on July 15, 1977.

In accordance with the present invention, an alternate means of preventing this radial compressive stress is provided by utilizing spacers located only in the vicinity of the spokes between each adjacent pair of rims. With prior art structures, it was necessary to size the spokes of the hub such that the outer rim would lift-off or lose contact with its adjacent rim at a predetermined speed, typically 110 percent of rated speed. Thus, the inner rims were deformed too much to attain circularity at the same time the outer rim became circular. In accordance with this invention, spokes of the hub are sized such that the inner rim will lift off at the predetermined speed. Spacers are placed between the inner rim and its adjacent rim of a size such that the adjacent rim lifts off at this same speed. Spacers of appropriate size continue to be placed between rims such that will attain circularity simultaneously. In this manner, the radial stresses which might produce filament and matrix damage and result from excessive rim non-circularity at intermedate speeds are prevented.

Examples of flywheel structures found in the prior art include Blank U.S. Pat. No. 284,369, Burger U.S. Pat. No. 1,765,754, Defosse U.S. Pat. No. 2,539,730, Reinhart Jr. U.S. Pat. No. 3,296,886, Wetherbee Jr. U.S. Pat. No. 3,602,066, Wetherbee Jr. U.S. Pat. No. 3,602,067, Post U.S. Pat. No. 3,683,216, Post U.S. Pat. No. 3,714,034, Post U.S. Pat. No. 3,859,868, British Pat. No 7,262, and Austrian Pat. No. 61,717. However, none of these patents illustrate or suggests the invention described and claimed herein.

The advantages of this invention will be more readily apparent when the following specification is read in conjunction with the appended drawings, wherein.

Figure 1:
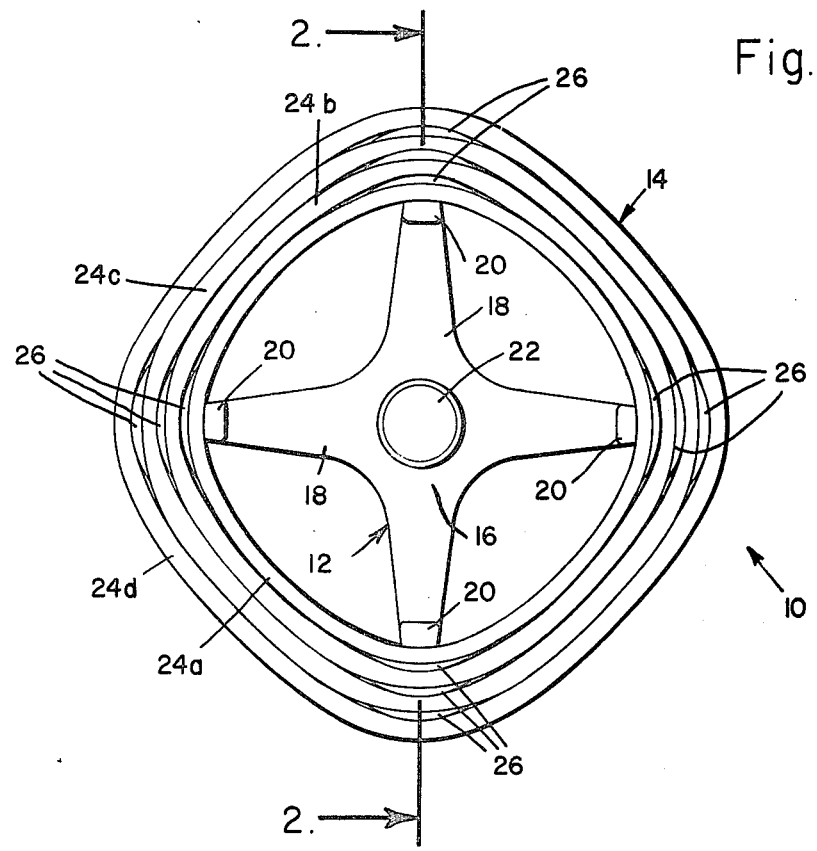
FIG. 1 is an end plan view of a flywheel in accordance with this invention in its rest configuration.
Figure 2:
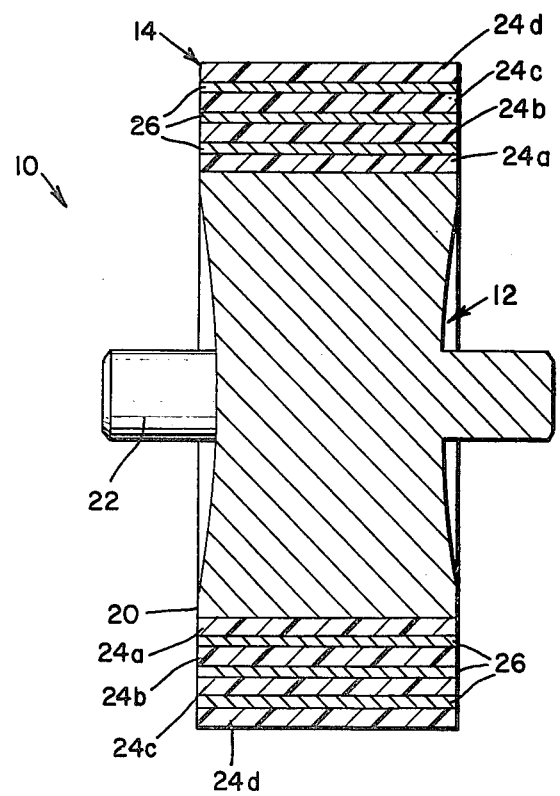
FIG. 2 is a cross-sectional view taken generally along the line 2—2 of FIG 1.
Figure 3:
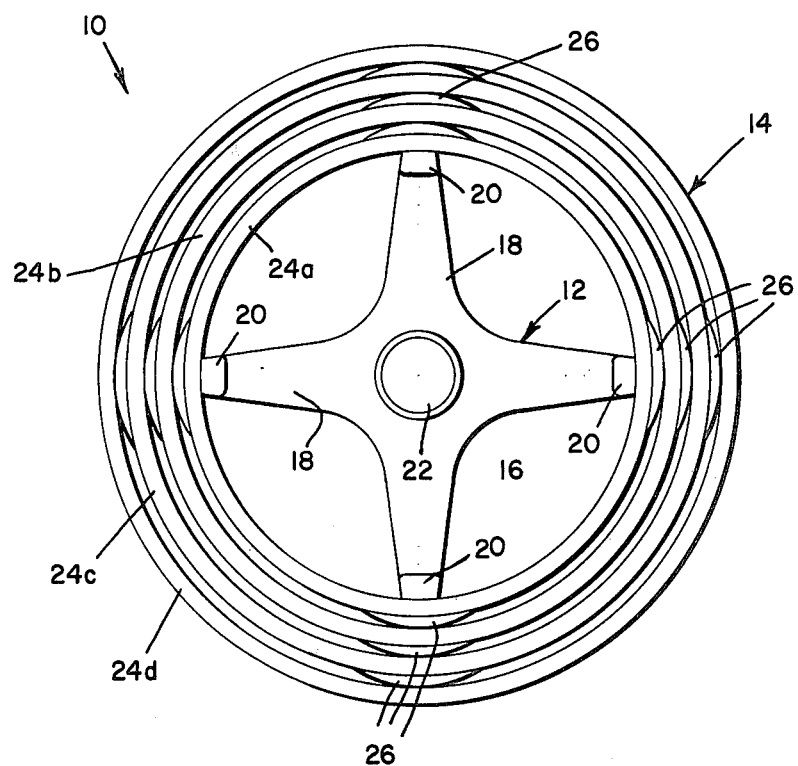
FIG. 3 is an end plan view similar to FIG. 1 of the flywheel rotating at its operational speed.

Referring now to the drawings, FIGS. 1-3 illustrate a flywheel 10 constructed in accordance with this invention and comprising a hub and spoke assembly or spider 12 and a rim assembly 14.

The spider 12 is best illustrated in FIGS. 1 and 2 and generally comprises a central or hub portion 16 from which a plurality of spokes 18 radially extend. The spokes may have any desired configuration but preferably have a shape which minimizes centrifugal stress in the spoke. This permits the use of light structure materials, such as aluminum, in the manufacture of the spider. An outer portion 20 of each spoke 18 may be enlarged to accommodate mounting of the rim assembly 14, or maybe as nearly as broad as the rim assembly throughout its length. A shaft 22 may be secured to, or integrally formed with, the spider 12 to accommodate mounting of the flywheel on low friction bearings (not shown) for operation in a manner well known to those skilled in the art.

The rim assembly 14 preferably comprises a plurality of nested tubular rim members 24 interspersed with a plurality of spacers 26. While four nested rim members shown for purposes of illustration, it should be noted that flywheels in accordance with this invention may be constructed with any desired number of rim members.

Figure 4:
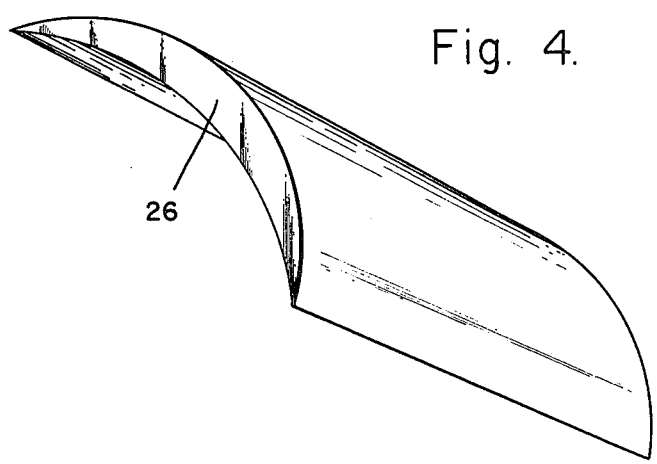
FIG. 4 is a perspective view of a spacer for use in a flywheel in FIGS. 1-3.

While, as taught in the aforementioned U.S. Pat. No. 4,036,080, the rims may be wound in a circular configuration and distorted into a non-circular configuration for mounting on the spider, it is preferable to wind the rim assembly 14 in its non-circular configuration. First, an inner rim member 24a is wound on a suitable form of a material such as E-glass or "Kevlar" filament material in an appropriate matrix material such as epoxy. After the inner rim member 24a has been wound, it is dried and cured. Following curing, suitably formed spacers 26, one of which is illustrated in FIG. 4, are mounted on an outer surface of the rim member 24a at the point corresponding with the location of the spokes 18. The spacers are equal in number to the number of spokes and are secured to the rim member 24a by an epoxy glue or other suitable means.

Each spacer 26 is preferably a composite fiber reinforced epoxy pad which is shaped to conform to the deformed rim on which it is to be placed and has an outer contour which will result in circularity of the next rim at speed. Each spacer 26 has mechanical characteristics substantially similar to those of the rim members 24 and may be constructed by molding or in any suitable manner, many of which are known to those skilled in the art.

Before winding the second rim member 24b, it may be desirable to place a layer of material such as "Teflon" or "Mylar" plastic film around rim member 24a and its attached spacers 26 to prevent adhesion at the engaging surfaces of adjacent members.

The second rim member 24b is then wound over the inner rim member 24a and spacers 26 and this combination is dried and cured. Additional spacers 26 are then secured to rim member 24b in alignment with the spokes 18 and a layer of plastic film placed thereon so that remaining rim members and spacers may be constructed on to the flywheel in a similar fashion. No spacers are placed outside the outer rim member 24d.

In constructing the flywheel, the spider may be structured with spokes 18 of a suitable dimension such that the inner rim member 24a will attain circularity at a predetermined peripheral speed, for example 800 meters per second. The spacers 26 on the inner rim member 24a are made of a sufficient thickness such that the next rim member 24b will attain circularity at the same speed. In the same manner all of the spacers are sized such that each rim will attain circularity of the same speed such that the flywheel achieves the configuration illustrated in FIG. 3 at this predetermined speed wherein the rims are generally circular and have a slight space between adjacent surfaces except at positions corresponding to the spokes 18 where contact is retained between adjacent rim members 24 and spacers 26 and between the inner rim member 24a and the outer portion 20 of each spoke 18. It should be noted that the relative sizes of flywheel components in the drawings are exaggerated for purposes of illustration. Spacer thickness would preferably be very small as compared to rim thickness.

For example, for a flywheel with an outer diameter of about 50 inches, and rim members about 0.3 inches thick, the spacers would have a thickness on the order of 0.02 inches.

Thus, the use of the spacers produces less deformation at rest for the inner rims than the outer rims so that all of the rims become circular at the same operating speed and in so doing attain less non-circularity at intermediate speeds. This avoids the substantial magnitude of radial inward forces otherwise applied against the spokes 18 by the inner rim member 24a at speed and reduces the radial compressive force which might otherwise result in filament damage.

We claim:

1. A method of storing energy in a flywheel having a shaft with spokes of a predetermined radius and a plurality of nested rims having an inner radius less than the radius of said spokes, said method comprising the steps of:
    positioning spacer means between each pair of adjacent rims in radial alignment corresponding to each of said spokes;
    positioning the rim assembly on the spokes of said shaft in a non-circular configuration with said spacer means aligned with said spokes to increase non-circularity of the rim outside each of said spacer means; and
    causing rotational motion of said flywheel at a speed at which said rim assembly assumes a substantially circular configuration.

2. A method of constructing a flywheel having a shaft with spokes of a predetermined radial dimension, said method comprising the steps of:
    forming a plurality of nested cylindrical rims having an inner radius less than said predetermined radial dimension;
    positioning spacer means between each adjacent pair of said rims in radially aligned sets;
    deforming said cylindrical rim to produce a plurality of enlarged points on said rims having a radial dimension not less than said predetermined radial dimension, each of said sets of spacer means being positioned at one of said enlarged points to increase the radial dimension of said enlarged points outside said spacer means;
    mounting said rims on said spokes with the enlarged points respectively aligned with said spokes; and
    releasing said rims to firmly engage said spokes.

3. A method of constructing a flywheel having a shaft with spokes of a predetermined radial dimension, said method comprising the steps of:
    forming first rim means on the spokes of said shaft in a non-circular configuration;
    positioning first spacer means on said first rim means at positions radially aligned with said spokes; and
    forming second rim means around said first rim means and spacer means such that the non-circularity of said second rim means is enhanced by said spacer means.

4. The method of claim 3 including the additional steps of:
    positioning additional spacer means on said second rim means radially aligned with said spokes; and
    forming third rim means around said second rim means and additional spacer means.

5. A flywheel comprising hub means, and a plurality of nested rims positioned on said hub means, said rims having a non-circular configuration with a plurality of enlarged points when said flywheel is at rest and having a substantially circular configuration when said flywheel is spinning at a preselected speed, a plurality of spacer means being positioned between adjacent pairs of rims in radial alignment at each of said enlarged points for increasing non-circularity of the rim outside each of said spacer means.

6. A flywheel as in claim 5 wherein said hub means has a plurality of spokes, and said plurality of nested rims are positioned on said spokes with said enlarged points and said spacer means in radial alignment with said spokes.

7. A method of constructing a flywheel having at least two rims disposed around a hub having a plurality of spokes, said method comprising the steps of:
    constructing a first tubular rim;
    securing spacers at predetermined positions around said first tubular rim;
    constructing a second tubular rim on the first tubular rim and spacers without adhesion between the second rim and said first tubular rim and spacers; and
    mounting the first rim, spacers and second rim in a non-circular configuration on said hub with said spacers in radial alignment with said spokes for increasing the non-circularity of said second rim.

8. The method of claim 7 wherein the step of constructing said first tubular rim comprises the steps of:
    winding filament material in a matrix on a form; and
    curing said filament and matrix materials.

9. The method of claim 8 wherein said step of constructing said second tubular rim comprises the steps of:
    winding filament material in a matrix around said first tubular rim and spacers; and
    curing said second tubular rim.

10. A flywheel comprising:
    hub means and a plurality of nested rims positioned on said hub means first rim means having a plurality of enlarged points generally uniformly distributed therearound;
    a plurality of spacer means positioned around an outer surface of said first rim means at each of said enlarged points; and
    second rim means having a plurality of enlarged points generally uniformly distributed therearound mounted on said first rim means and said spacer means with the radial dimension of each enlarged point of said second rim means enhanced by said spacer means.

11. The flywheel of claim 10 including means for securing said spacer means to one of said first and second rim means.

12. The flywheel of claim 10 including hub means positioned in supporting relation within said first rim means.

13. The flywheel of claim 12 wherein said hub means has a plurality of spoke means and said enlarged points and spacer means are distributed in radial alignment with said spoke means.

14. The flywheel of claim 10 additionally including:
    an additional plurality of spacer means distributed around an outer surface of said second rim means in radial alignment with said first plurality of spacer means; and
    third rim means mounted on said second rim means and said additional spacer means.

* * * * *